United States Patent
Tamura

(10) Patent No.: US 12,542,175 B2
(45) Date of Patent: Feb. 3, 2026

(54) SEMICONDUCTOR DEVICE INCLUDING PRE-CHARGE CIRCUIT AND A METHOD OF OPERATING THEREOF

(71) Applicant: Taiwan Semiconductor Manufacturing Company, Ltd., Hsinchu (TW)

(72) Inventor: Motoki Tamura, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 303 days.

(21) Appl. No.: 18/169,588

(22) Filed: Feb. 15, 2023

(65) Prior Publication Data

US 2024/0144993 A1    May 2, 2024

Related U.S. Application Data

(60) Provisional application No. 63/419,956, filed on Oct. 27, 2022.

(51) Int. Cl.
    *G11C 11/4094*    (2006.01)

(52) U.S. Cl.
    CPC ................ *G11C 11/4094* (2013.01)

(58) Field of Classification Search
    CPC . G11C 11/4094; G11C 5/147; G11C 11/4074; G11C 7/12
    See application file for complete search history.

(56) References Cited

U.S. PATENT DOCUMENTS

| | | | |
|---|---|---|---|
| 4,205,369 A * | 5/1980 | Asano | H02M 3/07 363/62 |
| 5,847,597 A * | 12/1998 | Ooishi | G11C 5/143 327/543 |
| 9,735,682 B1 | 8/2017 | Tamura | |
| 2014/0119099 A1 | 5/2014 | Clark et al. | |
| 2015/0357026 A1 | 12/2015 | Osada et al. | |

OTHER PUBLICATIONS

Yoder, Flint. "Body Bias: What It Is, And Why You Should Care." Semiconductor Engineering Blog, Oct. 12, 2017, semiengineering.com/body-bias-what-it-is-and-why-you-should-care/ (Year: 2017).*
Office Action issued in connection with Taiwan Appl. No. 112125166 dated Dec. 6, 2023.

* cited by examiner

*Primary Examiner* — Amir Zarabian
*Assistant Examiner* — Bradley S Coon
(74) *Attorney, Agent, or Firm* — FOLEY & LARDNER LLP

(57) ABSTRACT

A semiconductor device and a method of operating the semiconductor device are disclosed. In one aspect, the semiconductor device includes a memory cell connected to a bit line, and a biasing circuit configured to output a first bias voltage and a second bias voltage, the first bias voltage generated based on a threshold voltage of a p-type transistor, and the second bias voltage generated based on a threshold voltage of an n-type transistor. The semiconductor device includes a step-down circuit connected to the bit line and configured to receive the first and second bias voltages, the step-down circuit configured to output an output voltage to charge the bit line based on the first and second bias voltages.

20 Claims, 17 Drawing Sheets

SEMICONDUCTOR DEVICE INCLUDING PRE-CHARGE CIRCUIT AND A METHOD OF OPERATING THEREOF

CROSS-REFERENCE TO RELATED APPLICATIONS

This application claims the benefit of and priority to U.S. Provisional Patent App. No. 63/419,956, filed Oct. 27, 2022, the entire disclosure of which is incorporated herein by reference.

BACKGROUND

Developments in electronic devices, such as computers, portable devices, smart phones, internet of thing (IoT) devices, etc., have prompted increased demands for memory devices. In general, memory devices may be volatile memory devices and non-volatile memory devices. Volatile memory devices can store data while power is provided, but may lose the stored data once the power is shut off. Unlike volatile memory devices, non-volatile memory devices may retain data even after the power is shut off, but may be slower than the volatile memory devices. A charging circuit can pre-charge a bit line connected to the memory devices when writing to or reading from the memory devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
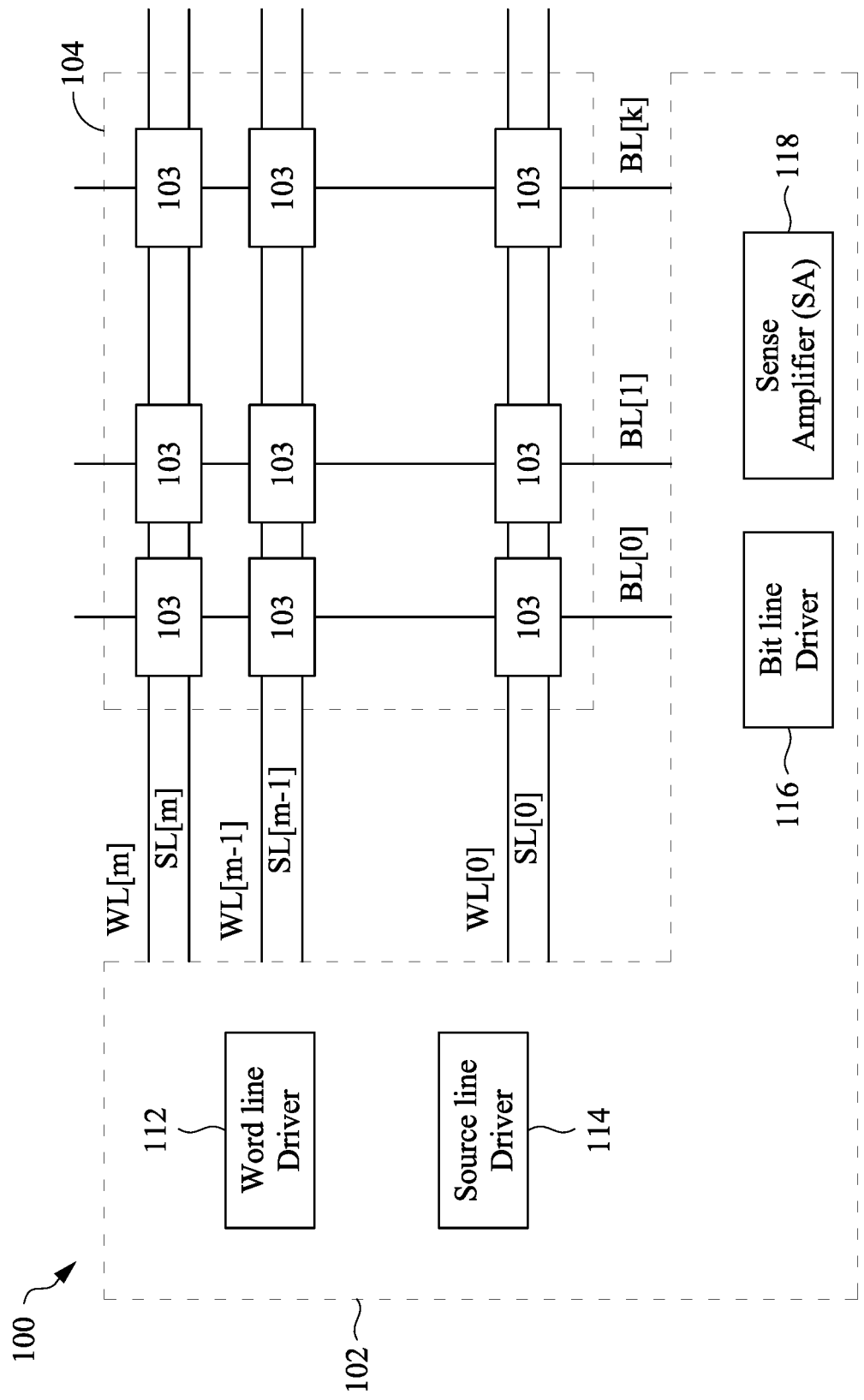
FIG. 1 illustrates a schematic block diagram of a memory device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In typical DRAM memory systems, the bit line is pre-charged to be half of the supply voltage during a read operation of the DRAM memory cell connected to the bit line. Some pre-charge circuits include the usage of a low-dropout (LDO) regulator or a charge pump circuit. The power consumption of an LDO regulator can be high compared to the charge pump circuit. However, a drawback of charge pump circuits is higher voltage ripple or noise compared to the LDO regulator. Accordingly, a step-down circuit may be used to generate a voltage that is half of the input voltage. The step-down circuit can be used to reliably operate with a transistor that has a breakdown voltage lower than an input voltage. However, a drawback of the step-down circuit is that the output voltage Vout may not be stable and have some ripple and switching noise. Accordingly there is a need for a charging circuit that is more stable and ripple and switching noise are reduced.

The present disclosure provides various embodiments of a system including a charging circuit and a method for operating the same. The charging circuit can include a step-down circuit that can provide a pre-charge voltage for the bit lines that is equal to or substantially equal to half of the supply voltage. The step-down circuit can receive bias voltages that are generated from bias voltage generation circuits, and the bias voltages can be a threshold voltage higher than a typical bias voltage (e.g., Vbias+Vbiasn) or a threshold voltage lower than a typical bias voltage (e.g., Vbias−|Vbiasp|). By adjusting the bias voltages provided to the step-down circuit to be greater or lower than the bias voltage by a threshold voltage, the step-down circuit can advantageously provide a pre-charge voltage that is stable and with reduced ripple and switching noise.

FIG. 1 illustrates a schematic block diagram of a memory device 100, in accordance with some embodiments. A memory device is a type of an IC device. In at least one embodiment, a memory device is an individual IC device. In some embodiments, a memory device is included as a part of a larger IC device which comprises circuitry other than the memory device for other functionalities.

The memory device 100 comprises at least one memory cell 103 and a controller (also referred to as "control circuit") 102 coupled to control an operation of the memory cell 103. In the example configuration in FIG. 1, the memory device 100 comprises a plurality of memory cells 103 arranged in a plurality of columns and rows in a memory array 104. The memory device 100 further comprises a plurality of word lines WL[0] to WL[m] extending along the rows, a plurality of source lines SL[0] to SL[m] extending along the rows, and a plurality of bit lines (also referred to as "data lines") BL[0] to BL[k] extending along the columns of the memory cells 103. Each of the memory cells 103 is coupled to the controller 102 by at least one of the word lines, at least one of the source lines, and at least one of the bit lines. Examples of word lines include, but are not limited to, read word lines for transmitting addresses of the memory cells 103 to be read from, write word lines for transmitting addresses of the memory cells 103 to be written to, or the like. In at least one embodiment, a set of word lines is configured to perform as both read word lines and write word lines. Examples of bit lines include read bit lines for transmitting data read from the memory cells 103 indicated by corresponding word lines, write bit lines for transmitting data to be written to the memory cells 103 indicated by corresponding word lines, or the like. In at least one embodiment, a set of bit lines is configured to perform as both read bit lines and write bit lines. In one or more embodiments, each memory cell 103 is coupled to a pair of bit lines referred to as a bit line and a bit line bar. The word lines are commonly referred to herein as WL, the source lines are commonly referred to herein as SL, and the bit lines are commonly referred to herein as BL. Various numbers of word lines and/or bit lines and/or source lines in the memory device 100 are within the scope of various embodiments. In at least one embodiment, the source lines SL are arranged in the columns, rather than in the rows as shown in FIG. 1. In at least one embodiment, the source lines SL are omitted.

In the example configuration in FIG. 1, the controller 102 comprises a word line driver 112, a source line driver 114, a bit line driver 116, and a sense amplifier (SA) 118 which are configured to perform at least one of a read operation or a write operation. In at least one embodiment, the controller 102 further includes one or more clock generators for providing clock signals for various components of the memory device 100, one or more input/output (I/O) circuits for data exchange with external devices, and/or one or more controllers for controlling various operations in the memory device 100. In at least one embodiment, the source line driver 114 is omitted.

The word line driver 112 is coupled to the memory array 104 via the word lines WL. The word line driver 112 is configured to decode a row address of the memory cell 103 selected to be accessed in a read operation or a write operation. The word line driver 112 is configured to supply a voltage to the selected word line WL corresponding to the decoded row address, and a different voltage to the other, unselected word lines WL.

The source line driver 114 is coupled to the memory array 104 via the source lines SL. The source line driver 114 is configured to supply a voltage to the selected source line SL corresponding to the selected memory cell 103, and a different voltage to the other, unselected source lines SL.

The bit line driver 116 (also referred as "write driver") is coupled to the memory array 104 via the bit lines BL. The bit line driver 116 is configured to decode a column address of the memory cell 103 selected to be accessed in a read operation or a write operation. The bit line driver 116 is configured to supply a voltage to the selected bit line BL corresponding to the decoded column address, and a different voltage to the other, unselected bit lines BL. In a write operation, the bit line driver 116 is configured to supply a write voltage (also referred to as "program voltage") to the selected bit line BL. In a read operation, the bit line driver 116 is configured to supply a read voltage to the selected bit line BL.

The bit line driver 116 may include a pre-charge circuit (or a charging circuit). The charging circuit can charge the bit line BL (and bit line bar, not shown) to a desired voltage level. For example, the bit line BL can be charged to half of the supply voltage VDD.

The SA 118 is coupled to the memory array 104 via the bit lines BL. In a read operation, the SA 118 is configured to sense data read from the accessed memory cell 103 and retrieved through the corresponding bit lines BL. The described memory device configuration is an example, and other memory device configurations are within the scopes of various embodiments. In at least one embodiment, the memory device 100 is non-volatile memory or volatile memory, and the memory cells 103 can include dynamic random access (DRAM) memory cells. Other types of memory are within the scopes of various embodiments.

The transistors in this disclosure are shown to have a certain type (n-type or p-type), but embodiments are not limited thereto. The transistors can be any suitable type of transistor including, but not limited to, metal oxide semiconductor field effect transistors (MOSFET), complementary metal oxide semiconductors (CMOS) transistors, P-channel metal-oxide semiconductors (PMOS), N-channel metal-oxide semiconductors (NMOS), bipolar junction transistors (BJT), high voltage transistors, high frequency transistors, P-channel and/or N-channel field effect transistors (PFETs/NFETs), FinFETs, planar MOS transistors with raised source/drains, nanosheet FETs, nanowire FETs, or the like.

In some embodiments, the controller 102 includes the word line driver 112, source line driver 114, bit line driver 116, and sense amplifier 118, as well as a plurality of other circuits such as one or more multiplexors, one or more pass gate transistors (or pass transistors), and/or one or more level shifters, where each of these other circuits can include p-type or n-type transistors. The multiplexors, the pass gate transistors, the sense amplifier 118, and the level shifters can be generally disposed on opposing sides of the word line driver 112, source line driver 114, and/or bit line driver 118. The controller 102 can be disposed on the substrate and connected to the memory array 104 through one or more bit lines BL, one or more source lines SL and/or one or more word lines WL that can be disposed in one or more metallization layers and/or one or more via structures.

Figure 2:
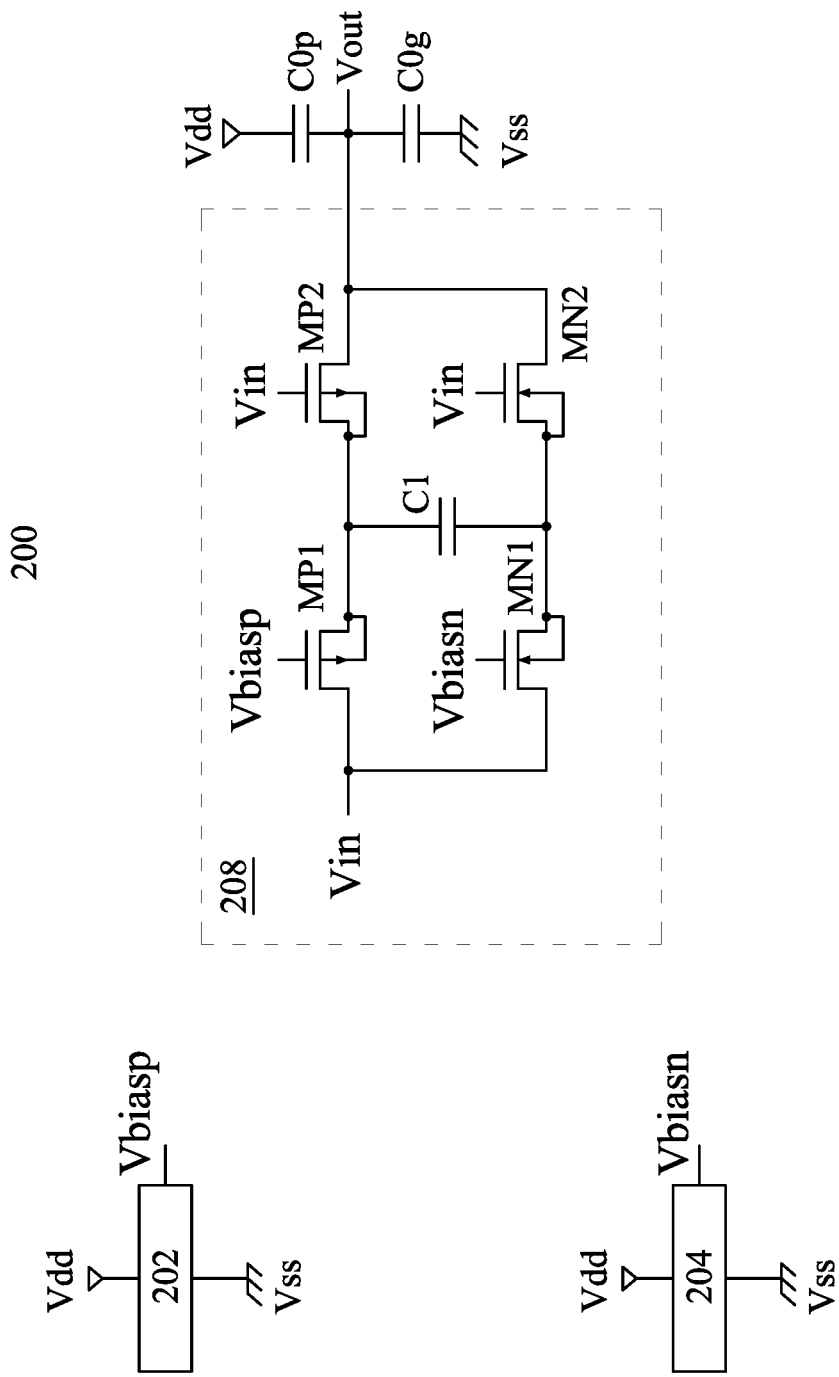
FIG. 2 illustrates a schematic of an example charging circuit, in accordance with some embodiments.

FIG. 2 illustrates a schematic of an example charging circuit 200, in accordance with some embodiments. The charging circuit 200 includes a first bias voltage generator 202, a second bias voltage generator 204, and a step-down circuit 208. Although certain circuit schematics including certain transistors and connections are shown in FIG. 2, embodiments are not limited thereto, and certain modifications can be made to the circuit diagrams.

The first bias voltage generator 202 can generate a first bias voltage Vbiasp. The first bias voltage Vbiasp can be a bias voltage that is input to a p-type transistor. The second bias voltage generator 204 can generate a second bias voltage Vbiasn. The second bias voltage Vbiasn can be a bias voltage that is input to an n-type transistor. Further details regarding the first and second bias voltage generators 202 and 204 can be found below.

The step-down circuit 208 includes p-type transistors MP1 and MP2, n-type transistors MN1 and MN2, and capacitors C1, C0p, and C0g. The step-down circuit 208 can be controlled by several signals. For example, the input voltage Vin can be connected to the gate of the transistors MP2 and MN2, the first bias voltage Vbiasp can be connected to the gate of the transistor MP1, and the second bias voltage Vbiasn can be connected to the gate of the transistor MN1. A first S/D terminal of each of the transistors MP1 and MN1 can be connected to the input voltage Vin1. A second S/D terminal of the transistor MP1 can be connected to a first terminal of capacitor C1 and a first S/D terminal of the transistor MP2. A second S/D terminal of the transistor MN1 can be connected to a second terminal of capacitor C1 and a first terminal of the transistor MN2. Second S/D terminals of the transistors MP2 and MN2 can be connected to the output voltage Vout. The output terminal Vout can be connected to two capacitors C0p and C0g which are connected to the supply voltages Vdd and Vss, respectively. The capacitance of C0g may be greater than C1. The input voltage Vin1 can be controlled by a controller (e.g., controller 102) and/or by any sub-components therein (e.g., a word line from the word line driver 112, a source line from the source line driver 114, a bit line from the bit line driver 116, etc.). In the step-down circuit 208, each of the transistors MP1, MP2, MN1, and MN2 includes a back gate terminal (e.g., its corresponding substrate) that is connected to the source, which reduces a body effect of the transistors. Therefore, the threshold voltage can remain the same.

The step-down circuit 208 can be used to step down a power supply voltage (e.g., Vdd) to an output voltage Vout (e.g., Vdd/2). For example, if the power supply voltage is 3V, the output voltage Vout can be 1.5V. Each of the transistors MP1, MP2, MN1, MN2 can have a breakdown voltage that is greater than a reference voltage Vref, which is configured to be equal to Vdd/2. By providing a square wave input to the input voltage Vin, the capacitors C1, C0p, and C0g can be charged and discharged to provide the output voltage Vout to be Vdd/2.

Second bias voltage Vbiasn is applied to the gate terminal of the transistor MN1. The transistor MN1 is turned on when the input voltage Vin is in a range of 0 to Vbiasn−|Vthn|, and is turned off in the other ranges. Similarly, first bias voltage Vbiasp is applied to the gate terminal of the transistor MP1. The transistor MP1 is turned on when the input voltage Vin is in a range of Vbiasp+|Vthp| to Vdd, and is turned off in the other ranges. In addition, Vin is applied to the gate of the transistor MN2. The transistor MN2 is turned on when Vin is in a range satisfying a relationship of Vin≥Vn1+|Vthn|, and is turned off in the other ranges, where Vn1 is the voltage level at a node between the transistors MN1 and MN2. Similarly, Vin is applied to the gate terminal of the transistor MP2, and the transistor MP2 is turned on when Vin is in a range satisfying a relationship of Vin≤Vn2+|Vtp|, and is turned off in the other ranges, where Vn2 the voltage level at a node between the transistors MP1 and MP2.

In the period in which the transistors MN1 and MP1 are turned on, a voltage of each source terminal becomes a value corresponding to a voltage of each drain. Also, in the period in which the transistors MN2 and MP2 are turned on, a voltage of each drain terminal becomes a value corresponding to a voltage of each source.
By varying the Vin, the capacitors C0, C0g, and C0p can be variously charged and discharged such that the input voltage Vin (having a value of Vdd or Vss) can be stepped down to a value that is the average of the supply voltages Vdd and Vss.

Figure 3:
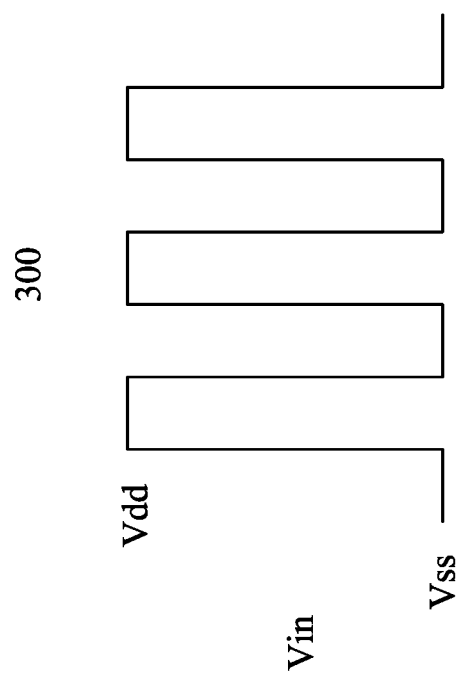
FIG. 3 illustrates an example waveform of the input voltage that is provided to the step-down circuit of FIG. 2, in accordance with some embodiments.

FIG. 3 illustrates an example waveform 300 of the input voltage that is provided to the step-down circuit 208 of FIG. 2, in accordance with some embodiments. The input voltage Vin can be provided as shown in the waveform 300. The input voltage Vin can have the shape of a square wave such that the voltage level of the input voltage Vin changes between a high of Vdd and a low of Vss. Although the waveform 300 shows a square wave, embodiments are not limited thereto. Furthermore, the minimum and maximum of the waveform 300 can include voltages other than Vss and Vdd, respectively. Furthermore, the frequency of the square wave can be controlled by a controller, for example, controller 102.

Figure 4:
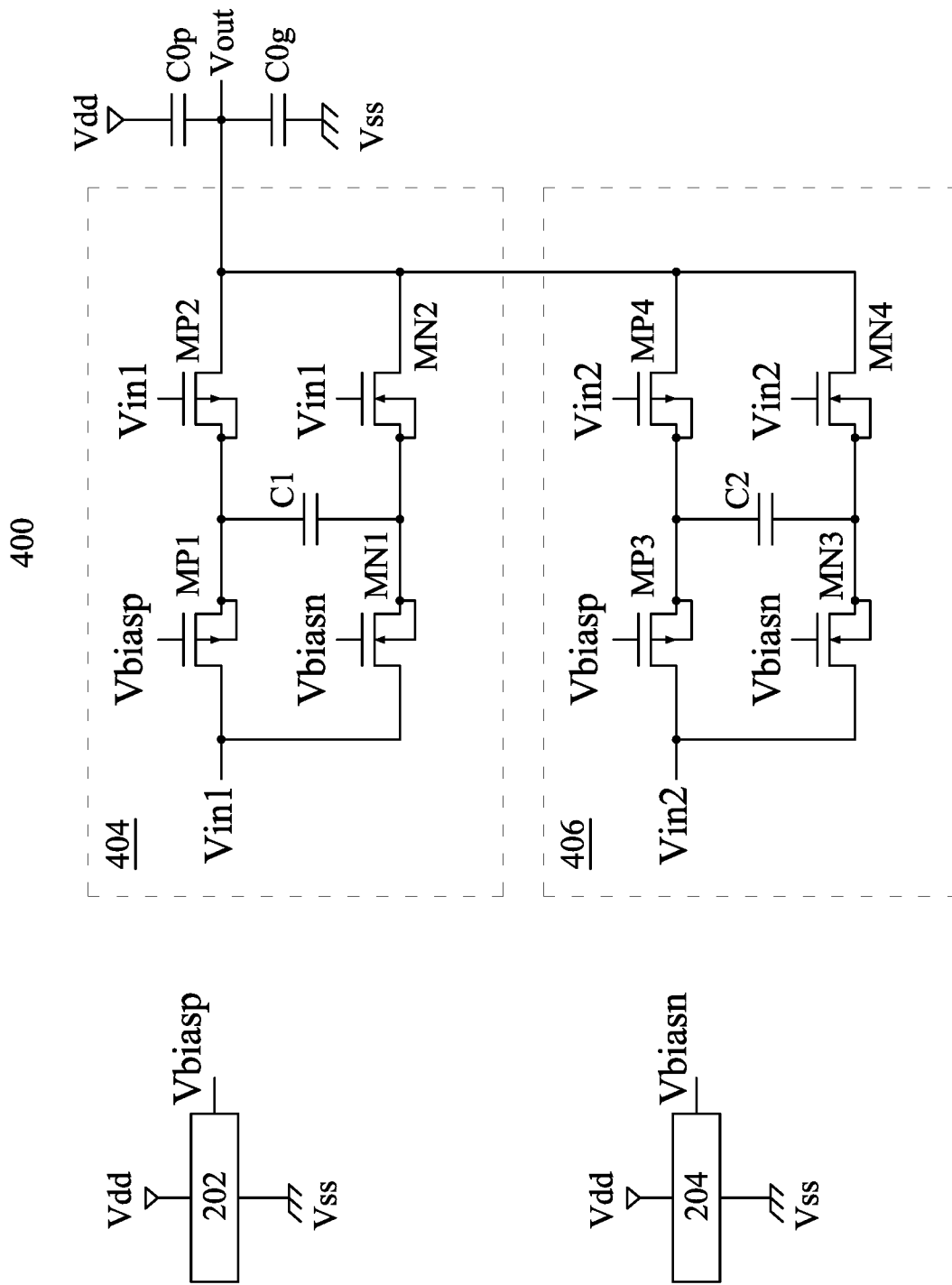
FIG. 4 illustrates a schematic of another example charging circuit, in accordance with some embodiments.

FIG. 4 illustrates a schematic of another example charging circuit 400, in accordance with some embodiments. The charging circuit 400 includes bias voltage generators 202 and 204, a first step-down circuit 404, and a second step-down circuit 406. Each of the first and second step-down circuits 404 and 406 is similar to the step-down circuit 208, except that the inputs to the transistors of the step-down circuit 406 may be different than the inputs to the transistors of the step-down circuit 208 and 404.

The step-down circuit 406 can include transistors MP3, MP4, MN3, and MN4. The transistor MP3 can be similar to the transistor MP1, the transistor MP4 can be similar to the transistor MP2, the transistor MN3 can be similar to the transistor MN1, and the transistor MN4 can be similar to the transistor MN2. Furthermore, the capacitor C2 can be similar to capacitor C1. The input voltage Vin2 can be the inverse of input voltage Vin1. For example, when the input voltage Vin1 is at supply voltage VDD, the input voltage Vin2 can be at supply voltage VSS, and when the input voltage Vin1 is at supply voltage VSS, the input voltage Vin2 can be at supply voltage VDD.

The input voltage Vin2 can be connected to the gate of the transistors MP4 and MN4, the first bias voltage Vbiasp can be connected to the gate of the transistor MP3, and the second bias voltage Vbiasn can be connected to the gate of the transistor MN3. A first S/D terminal of each of the transistors MP3 and MN3 can be connected to the input voltage Vin2. A second S/D terminal of the transistor MP3 can be connected to a first terminal of capacitor C2 and a first S/D terminal of the transistor MP4. A second S/D terminal of the transistor MN3 can be connected to a second terminal of capacitor C2 and a first terminal of the transistor MN4. Second S/D terminals of the transistors MP4 and MN4 can be connected to the output voltage Vout. The output terminal Vout can be connected to two capacitors C0p and C0g which are connected to the supply voltages Vdd and Vss, respectively. In the step-down circuit 406, each of the transistors MP3, MP4, MN3, and MN4 includes a back gate terminal (e.g., its corresponding substrate) that is connected to the source.

Figure 5:
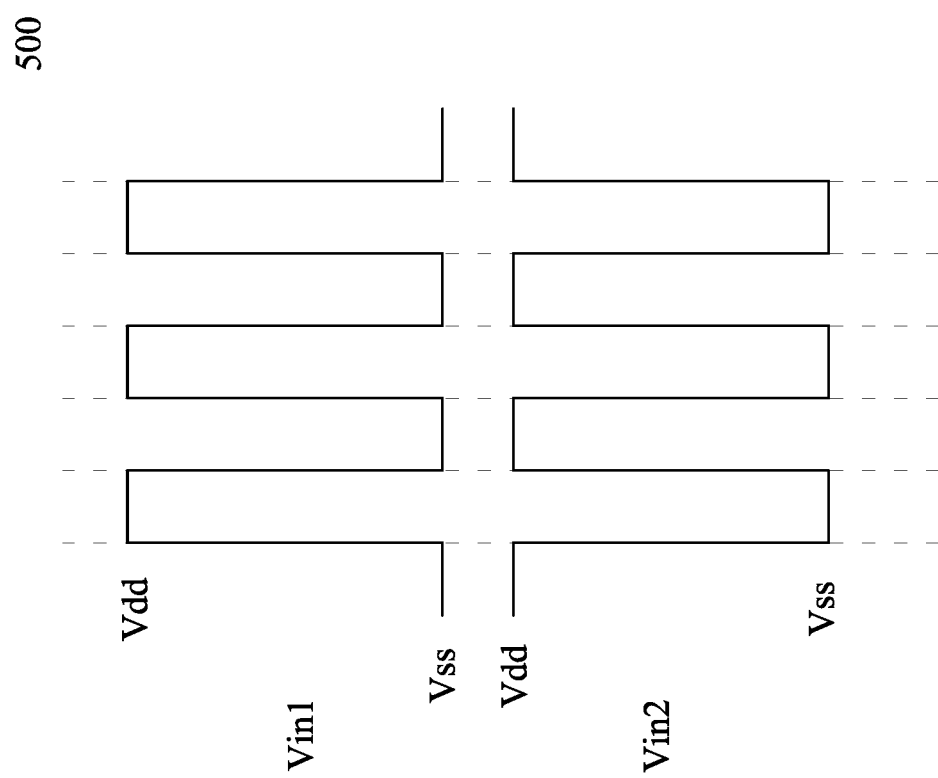
FIG. 5 illustrates an example waveform of the input voltages that are provided to the charging circuit of FIG. 4, in accordance with some embodiments.

FIG. 5 illustrates an example waveform 500 of the input voltages Vin1 and Vin2 that are provided to the charging circuit 400 of FIG. 4, in accordance with some embodiments. Each of the input voltages Vin1 and Vin2 can be provided as shown in the waveform 500. The input voltages Vin1 and Vin2 can have the shape of a square wave such that the voltage levels change between a high of Vdd and a low of Vss. Although the waveform 500 shows a square wave, embodiments are not limited thereto. Furthermore, the minimum and maximum of the waveform 500 can include voltages other than Vss and Vdd, respectively. Furthermore, the frequency of the square wave can be controlled by a controller, for example, controller 102. As shown in FIG. 5, the waveform of the input voltage Vin2 can be the inverse of the waveform of the input voltage Vin1.

Figure 6:
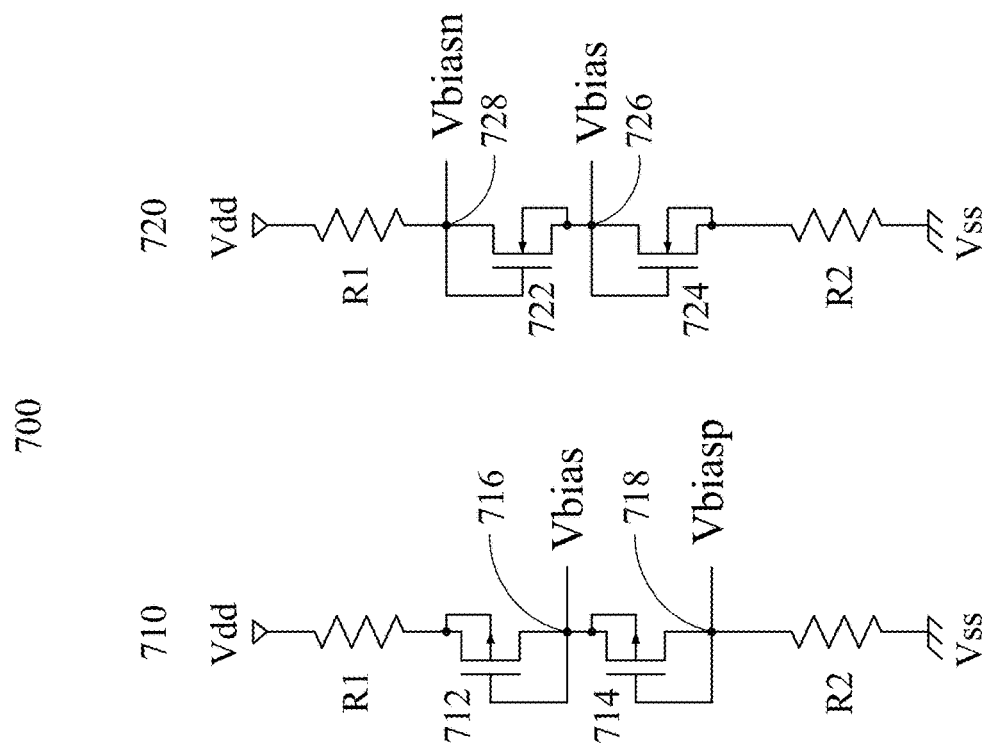

FIG. 6 illustrates a schematic of an example biasing circuit 600, in accordance with some embodiments. The biasing circuit 600 can include a voltage divider 602, a first bias voltage generation circuit 610, and a second bias voltage generation circuit 620. Although circuits having certain circuit devices are shown, embodiments are not limited thereto, and the bias voltages Vbiasp and Vbiasn can be provided in a variety of ways as discussed below.

The voltage divider 602 can include a two resistors R connected in series between the supply voltages Vdd and Vss. A node between the two resistors R can be connected to a voltage bias Vbias. The voltage bias Vbias can be connected to the first and second bias voltage generation circuits 610 and 620.

The first bias voltage generation circuit 610 can generate and provide the first bias voltage Vbiasp. The first bias voltage generation circuit 610 can include a voltage transformer 611, an operational amplifier (op-amp) 612 and a p-type transistor 614. The voltage transformer 611 (e.g., a current source) can provide a minimum voltage for the first bias voltage Vbiasp. The op-amp 612 can amplify a difference between the bias voltage Vbias (or third bias voltage) (from the voltage divider 602) and the output of the op-amp 612. An output (node 616) of the op-amp 612 can be provided as feedback to an input of the op-amp 612 such that the output of the op-amp 612 stabilizes to the bias voltage Vbias. Furthermore, the p-type transistor 614 can be turned on, which provides a voltage difference of Vgs (e.g., voltage difference between gate and source of the transistor 614) between the node 616 and a node 618. A voltage at the node 618 can then be provided as the first bias voltage Vbiasp. The first bias voltage Vbiasp can be substantially equal to Vbias−|Vthp|, where |Vthp| includes the absolute value of the threshold voltage of the transistor 614 when the Vgs is equal to Vds. Accordingly, the first bias voltage Vbiasp can be input to the step-down circuits 208, 404, and 406.

The second bias voltage generation circuit 620 can generate and provide the second bias voltage Vbiasn. The second bias voltage generation circuit 620 can include a voltage transformer 621, an op-amp 622, and an n-type transistor 624. The voltage transformer 621 (e.g., a current source) can provide a minimum voltage for the second bias voltage Vbiasn. The op-amp 622 can amplify a difference between the bias voltage Vbias (from the voltage divider 602) and a voltage at node 628. An output (node 626) of the op-amp 622 can be provided as the bias voltage Vbias and a gate voltage of the transistor 624. Furthermore, the transistor 624 can be turned on, which provides a voltage difference of Vthn (e.g., a threshold voltage of the transistor 624) between the node 626 and a node 628. A voltage at the node 628 can be provided as an input to the op-amp 622 such that the feedback loop allows the node 628 to stabilize at the bias voltage Vbias. Then, the value of the second bias voltage Vbiasn can be calculated as Vbias+Vthn, when the Vds is equal to the Vgs. Accordingly, the second bias voltage Vbiasn can be provided to the step-down circuits 208, 404, and 406.

Figure 7:
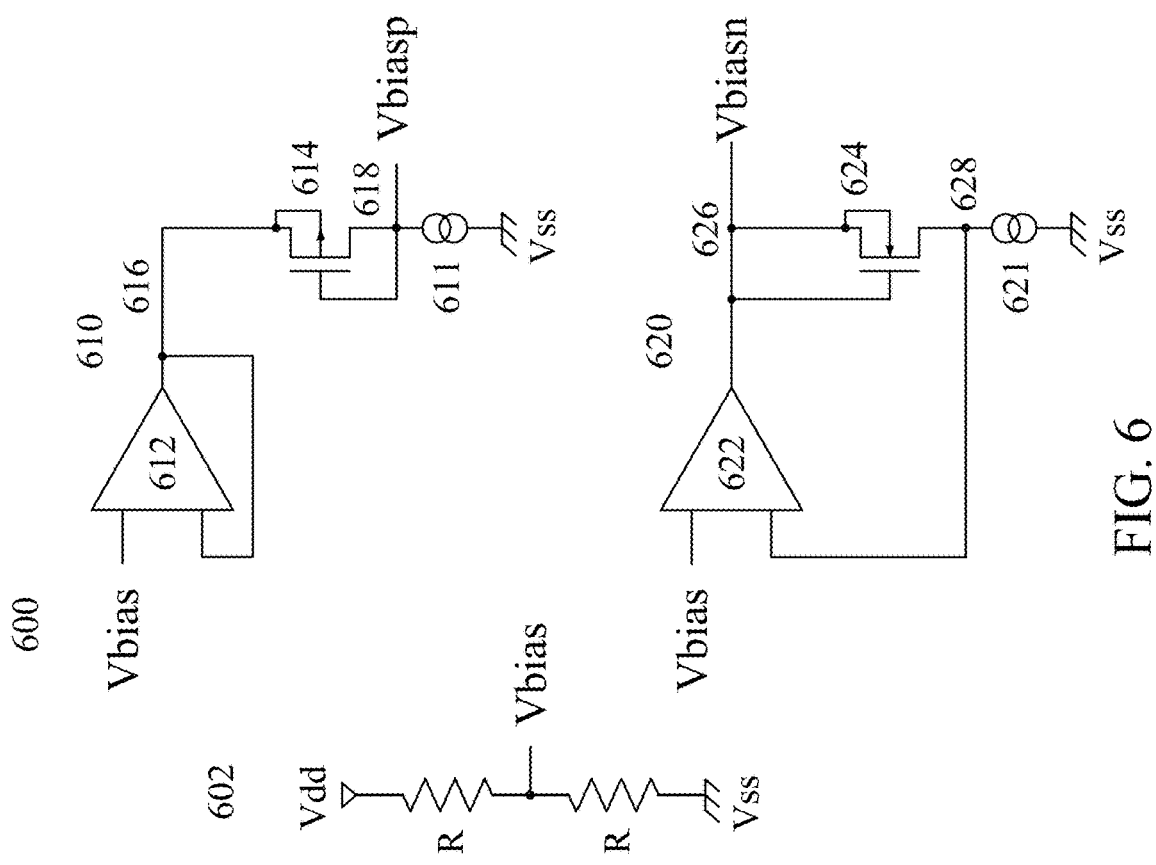
FIGS. 6, 7, and 8 each illustrates a schematic of an example biasing circuit, in accordance with some embodiments.

FIG. 7 illustrates a schematic of another example biasing circuit 700, in accordance with some embodiments. The biasing circuit 700 can include a first bias voltage generation circuit 710 and a second bias voltage generation circuit 720. The biasing circuit 700 can generate the bias voltages Vbiasp and Vbiasn using series resistance and diode-connected transistors, as opposed to op-amps as shown in FIG. 6.

The first bias voltage generation circuit 710 can include a first resistor R1, two diode-connected p-type transistors 712 and 714, and a second resistor R2 connected in series with one another. The transistors 712 and 714 can be diode-connected, meaning that the drain terminal and gate terminal of each transistor are connected to each other. Accordingly, the transistors 712 and 714 can operate in the saturation region. The source terminal of transistor 712 can be connected to the resister R1. The gate and drain terminals of the transistor 712 are also connected to the source terminal of the transistor 714 at node 716. The gate and drain terminals of the transistor 714 are connected to node 718, which is also connected to the resistor R2. The node 716 can provide the bias voltage Vbias, and the node 718 can provide the first bias voltage Vbiasp, which is equal to Vbias−|Vthp|. Accordingly, the first bias voltage Vbiasp can be input to the step-down circuits 208, 404, and 406.

The second bias voltage generation circuit 720 can include a first resistor R1, two diode-connected n-type transistors 722 and 724, and a second resistor R2 connected in series with one another. The transistors 722 and 724 can be diode-connected and operate in the saturation region. The gate and drain terminals of the transistor 722 are connected to the resistor R1 at node 728. The source terminal of transistor 722 is connected to node 726, which is also connected to the drain and gate terminals of the transistor 724. The source terminal of the transistor 724 is connected to the resistor R2. The node 726 can provide the bias voltage Vbias, and the node 728 can provide the second bias voltage Vbiasn, which is equal to Vbias+Vthn. Accordingly, the second bias voltage Vbiasn can be provided to the step-down circuits 208, 404, and 406.

Figure 8:
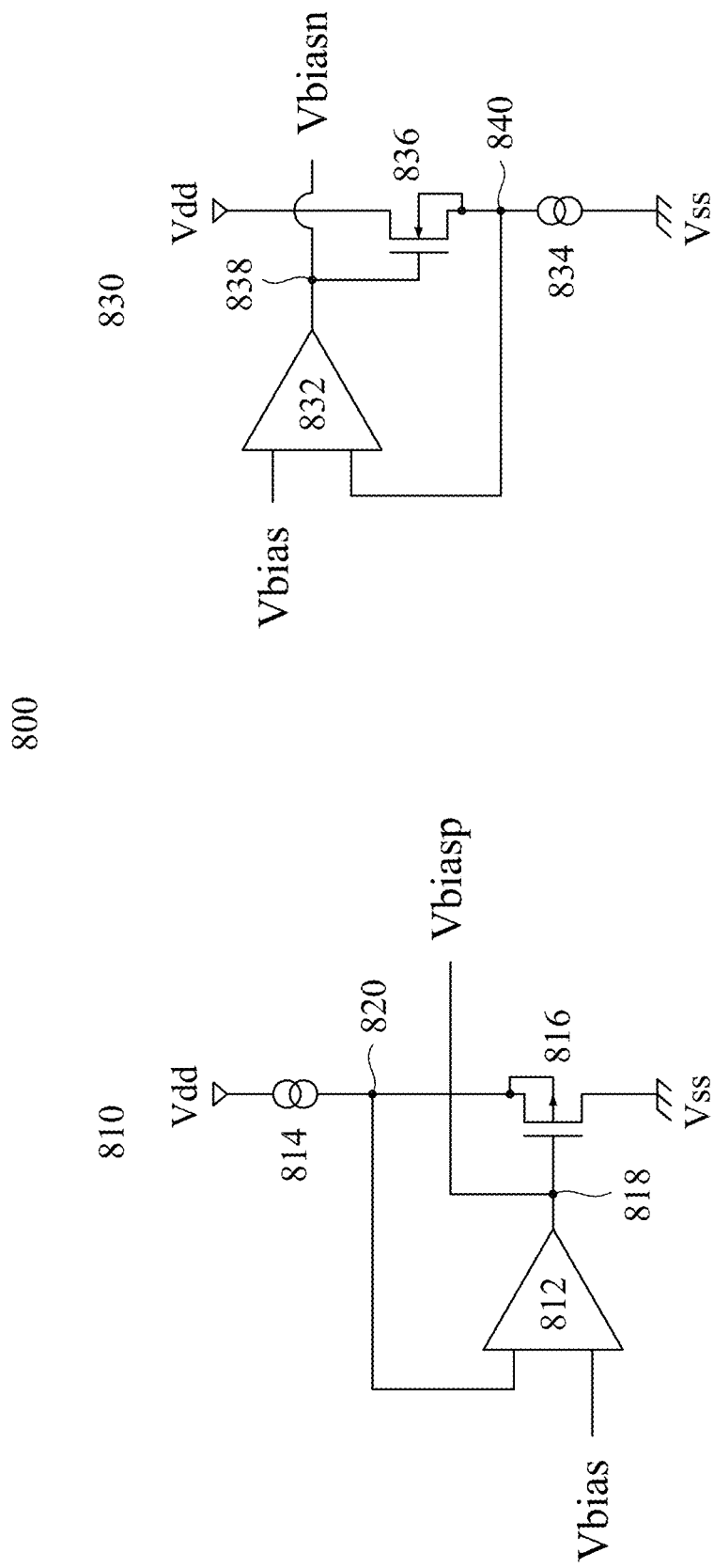

FIG. 8 illustrates a schematic of another example biasing circuit 800, in accordance with some embodiments. The biasing circuit 800 can include a first bias voltage generation circuit 810 and a second bias voltage generation circuit 830. The first bias voltage generation circuit 810 and second bias voltage generation circuit 830 can generate the bias voltages Vbiasp and Vbiasn, respectively, with improved threshold voltage shift that may be potentially caused by channel-length modulation and drain-induced barrier lowering (DIBL).

The first bias voltage generation circuit 810 can include an op-amp 812, a p-type transistor 816, and a voltage transformer 814. The op-amp 812 can receive the bias voltage Vbias (e.g., from voltage divider 602) and a voltage at node 820, which is connected to the voltage transformer 814 and a source terminal of the transistor 816. The voltage transformer 814 can provide an upper limit on the voltage of node 820. The voltage of the node 820 can stabilize at the bias voltage Vbias. An output of the op-amp 812 can be provided to node 818, which is also connected to a gate terminal of the transistor 816. The voltage at the node 818 can be provided as a first bias voltage Vbiasp, which can equal the bias voltage Vbias−|Vthp|, when the |Vds|>|Vgs|, the Vthp being the threshold voltage of the transistor 816 when an absolute value of the voltage difference between the drain terminal and source terminal |Vds| is greater than an absolute value of the voltage difference between the gate terminal and source terminal |Vgs|. Accordingly, the first bias voltage Vbiasp can be input to the step-down circuits 208, 404, and 406.

The second bias voltage generation circuit 830 can include an op-amp 832, an n-type transistor 836, and a voltage transformer 814. The op-amp 832 can receive the bias voltage Vbias (e.g., from voltage divider 602) and a voltage at node 840, which is connected to the voltage transformer 834 and a source terminal of the transistor 836. The voltage transformer 834 can provide a lower limit on the voltage of node 840. The voltage of the node 840 can stabilize at the bias voltage Vbias. An output of the op-amp 832 can be provided to node 838, which is also connected to a gate terminal of the transistor 836. The voltage at the node 838 can be provided as a second bias voltage Vbiasn, which can equal the bias voltage Vbias+Vthn, when the Vds>Vgs, the Vthn being the threshold voltage of the transistor 836 when the voltage difference between the drain terminal and source terminal Vds is greater than the voltage difference between the gate terminal and source terminal Vgs. Accordingly, the second bias voltage Vbiasn can be input to the step-down circuits 208, 404, and 406.

Figure 9:
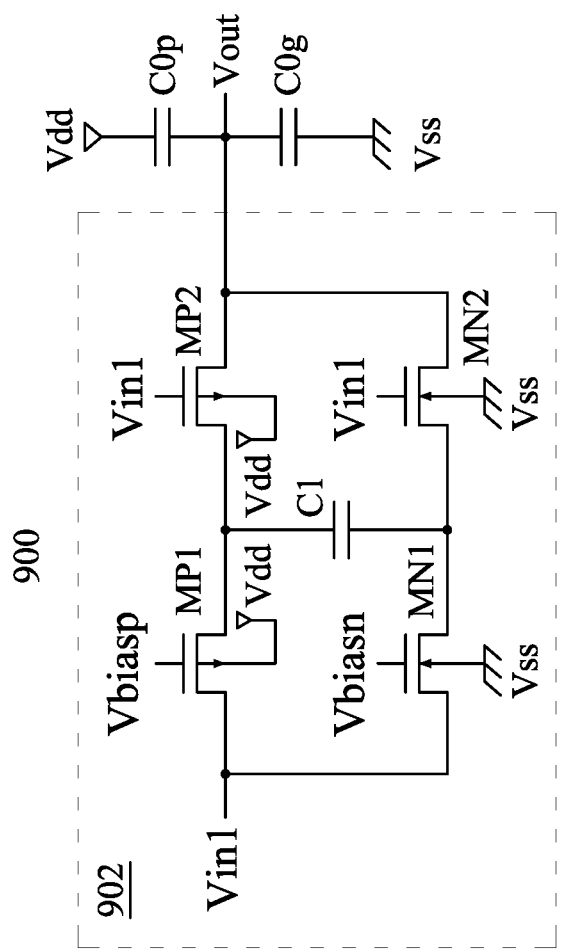
FIG. 9 illustrates a schematic of another example charging circuit, in accordance with some embodiments.

FIG. 9 illustrates a schematic of another example charging circuit 900, in accordance with some embodiments. The charging circuit 900 includes a step-down circuit 902. The step-down circuit 902 is similar to the step-down circuit 208 of FIG. 2, except that the transistors MP1, MP2, MN1, and MN2 do not have their back gate terminals (e.g., their corresponding substrates) connected to the respective source terminals. Instead, the back gate terminals of the transistors MP1 and MP2 are connected to a power supply Vdd, and the back gate terminals of the transistors MN1 and MN2 are connected to a power supply Vss.

Figure 10:
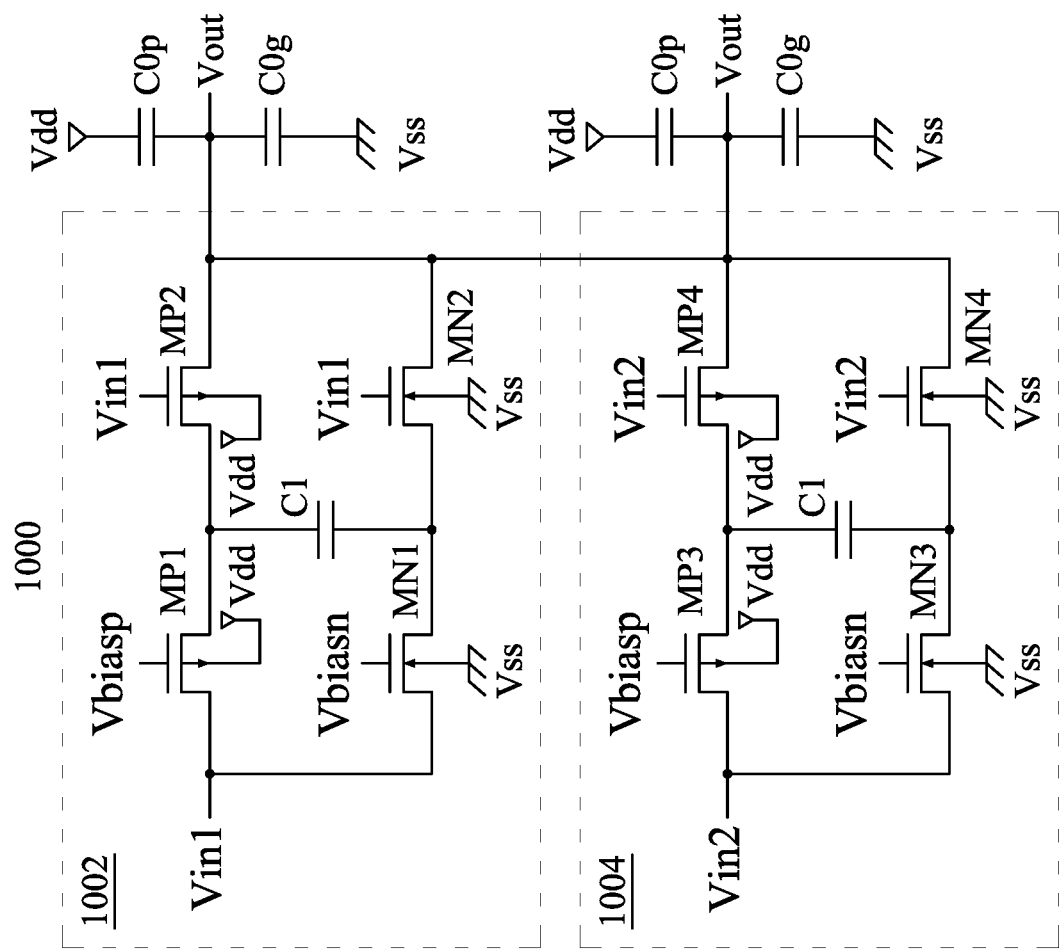
FIG. 10 illustrates a schematic of another example charging circuit, in accordance with some embodiments.

FIG. 10 illustrates a schematic of another example charging circuit 1000, in accordance with some embodiments. The charging circuit 1000 includes a first step-down circuit 1002 and a second step-down circuit 1004. Each of the first and second step-down circuits 1002 and 1004 are similar to the first and second step-down circuits 404 and 406, respectively, except that the transistors MP1-MP4, MN1-MN4 do not include floating well transistors. Instead, each of the transistors MP1-MP4 includes a back gate terminal that is connected to Vdd and each of the transistors MN1-MN4 includes a back gate terminal that is connected to Vss.

Figure 11:
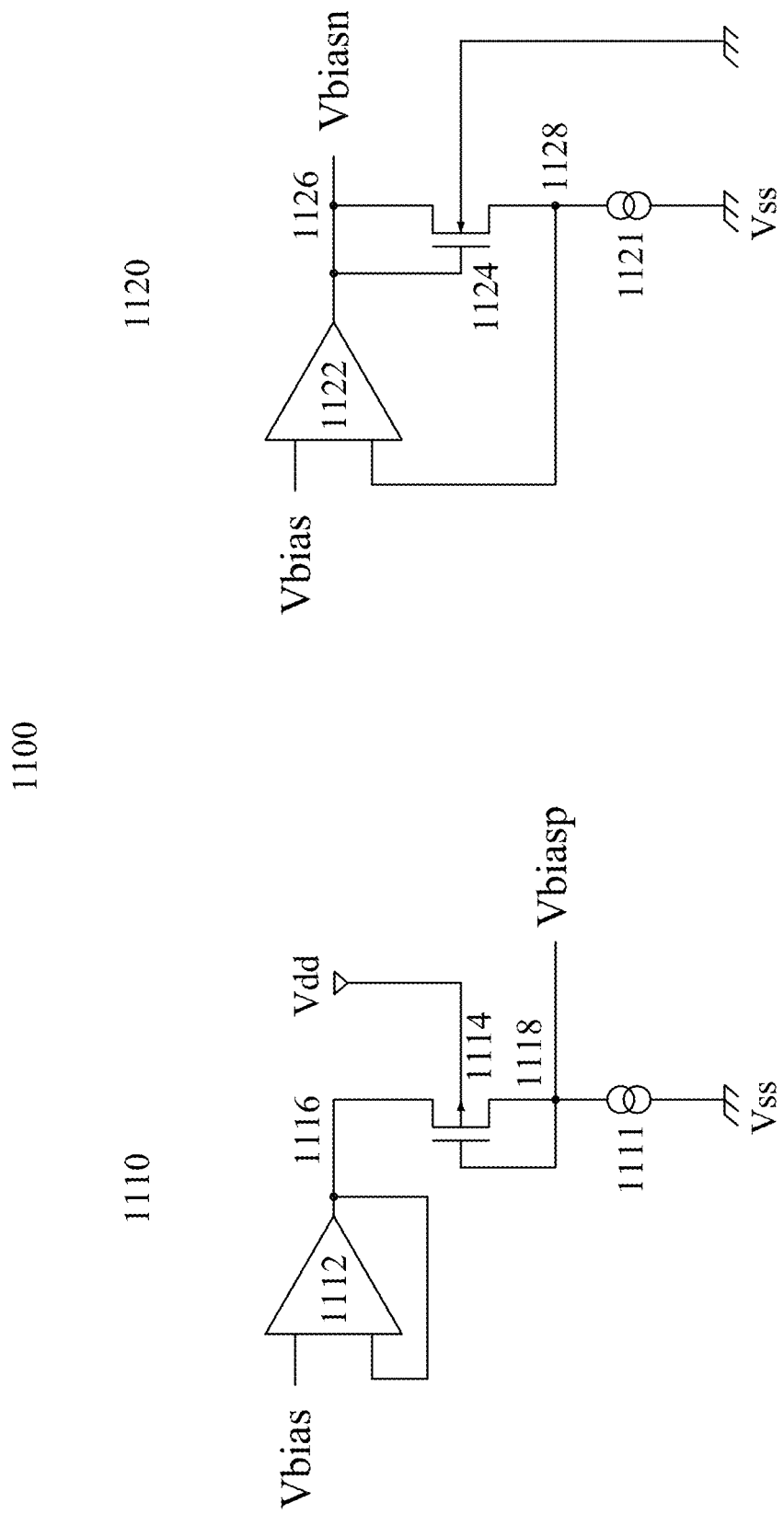
FIGS. 11, 12, 13, 14, 15, 16, and 17 each illustrates a schematic of an example biasing circuit, in accordance with some embodiments.

FIG. 11 illustrates a schematic of an example biasing circuit 1100, in accordance with some embodiments. The biasing circuit 1100 can include a first bias voltage generation circuit 1110 and a second bias voltage generation circuit 1120. The first bias voltage generation circuit 1110 can generate and provide the first bias voltage Vbiasp, and the second bias voltage generation circuit 1120 can generate and provide the second bias voltage Vbiasn.

The first bias voltage generation circuit 1110 can be similar to the first bias voltage generation circuit 610 of FIG. 6. For example, the first bias voltage generation circuit 1110 can include a voltage transformer 1111 (similar to the voltage transformer 611 of FIG. 6), an op-amp 1112 (similar to the op-amp 612), and a p-type transistor 1114 (similar to the transistor 1114). However, instead of a back gate terminal of the transistor 1114 being connected to the source terminal, the back gate terminal is connected to power supply Vdd. Accordingly, the first bias voltage Vbiasp can be input to the step-down circuits 902, 1002, and 1004.

The second bias voltage generation circuit 1120 can be similar to the second bias voltage generation circuit 620 of FIG. 6. For example, the first bias voltage generation circuit 1120 can include a voltage transformer 1121 (similar to the voltage transformer 621 of FIG. 6), an op-amp 1122 (similar to the op-amp 622), and an n-type transistor 1124 (similar to the transistor 1124). However, instead of a back gate terminal of the transistor 1124 being connected to the source terminal, the back gate terminal can be connected to the power supply Vss. Accordingly, the second bias voltage Vbiasn can be input to the step-down circuits 902, 1002, and 1004.

Figure 12:
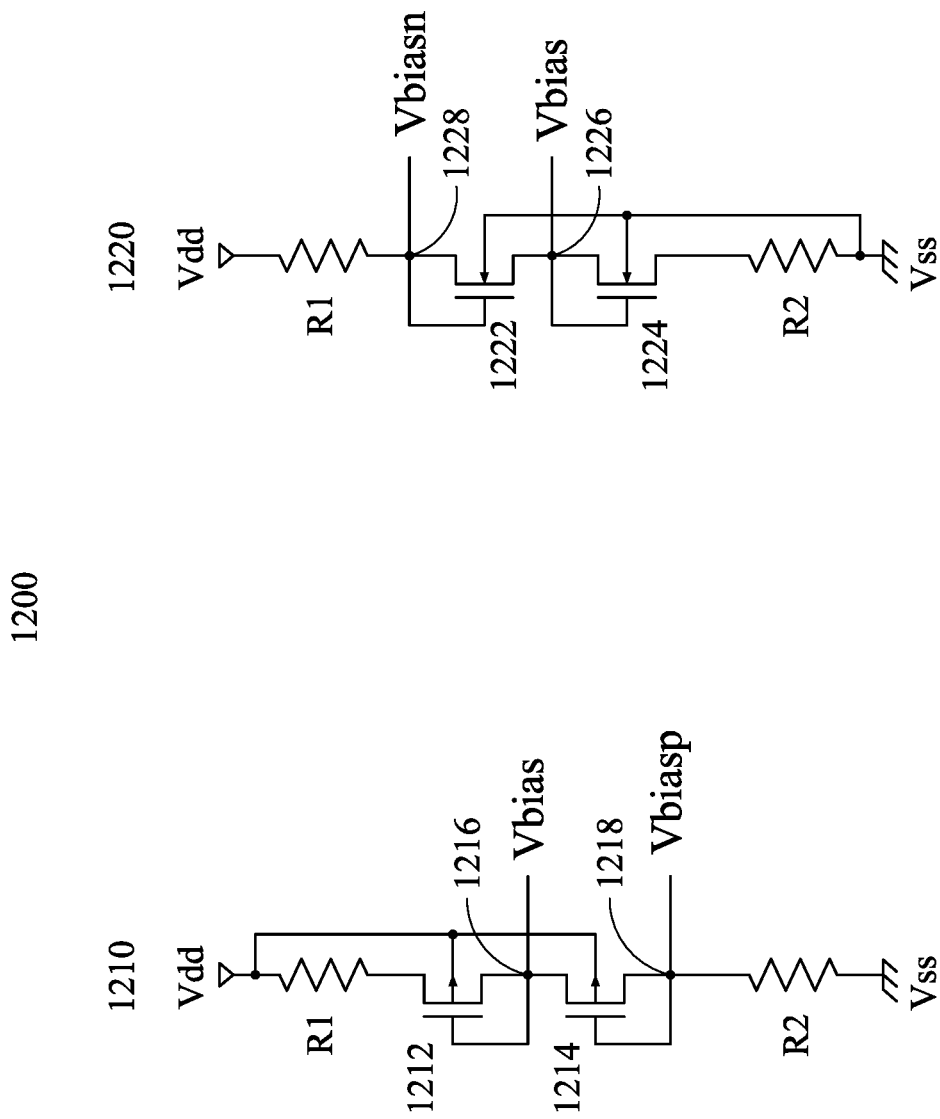

FIG. 12 illustrates a schematic of another example biasing circuit 1200, in accordance with some embodiments. The biasing circuit 1200 can include a first bias voltage generation circuit 1210 and a second bias voltage generation circuit 1220. The biasing circuit 1200 can generate the bias voltages Vbiasp and Vbiasn using series resistance and diode-connected transistors, as opposed to op-amps as shown in FIG. 11.

The first bias voltage generation circuit 1210 can be similar to the first bias voltage generation circuit 710 of FIG. 7. For example, the first bias voltage generation circuit 1210 can include a first resistor R1 (similar to R1 of FIG. 7), two diode-connected p-type transistors 1212 and 1214 (similar to transistors 712 and 714 of FIG. 7), and a second resistor R2 (similar to R2 of FIG. 7) connected in series with one another. However, the back gate terminals of the transistors 1212 and 1214 are connected to power supply Vdd. Accordingly, the first bias voltage Vbiasp (e.g., Vbias−|Vthp|) can be input to the step-down circuits 902, 1002, and 1004.

The second bias voltage generation circuit 1220 can be similar to the second bias voltage generation circuit 720 of FIG. 7. For example, the second bias voltage generation circuit 1220 can include a first resistor R1 (similar to R1 of FIG. 7), two diode-connected n-type transistors 1222 and 1224 (similar to transistors 722 and 724 of FIG. 7), and a second resistor R2 (similar to R2 of FIG. 7) connected in series with one another. However, the back gate terminals of the transistors 1222 and 1224 are connected to power supply Vss. Accordingly, the second bias voltage Vbiasn (e.g., Vbias+Vthn) can be input to the step-down circuits 902, 1002, and 1004.

Figure 13:
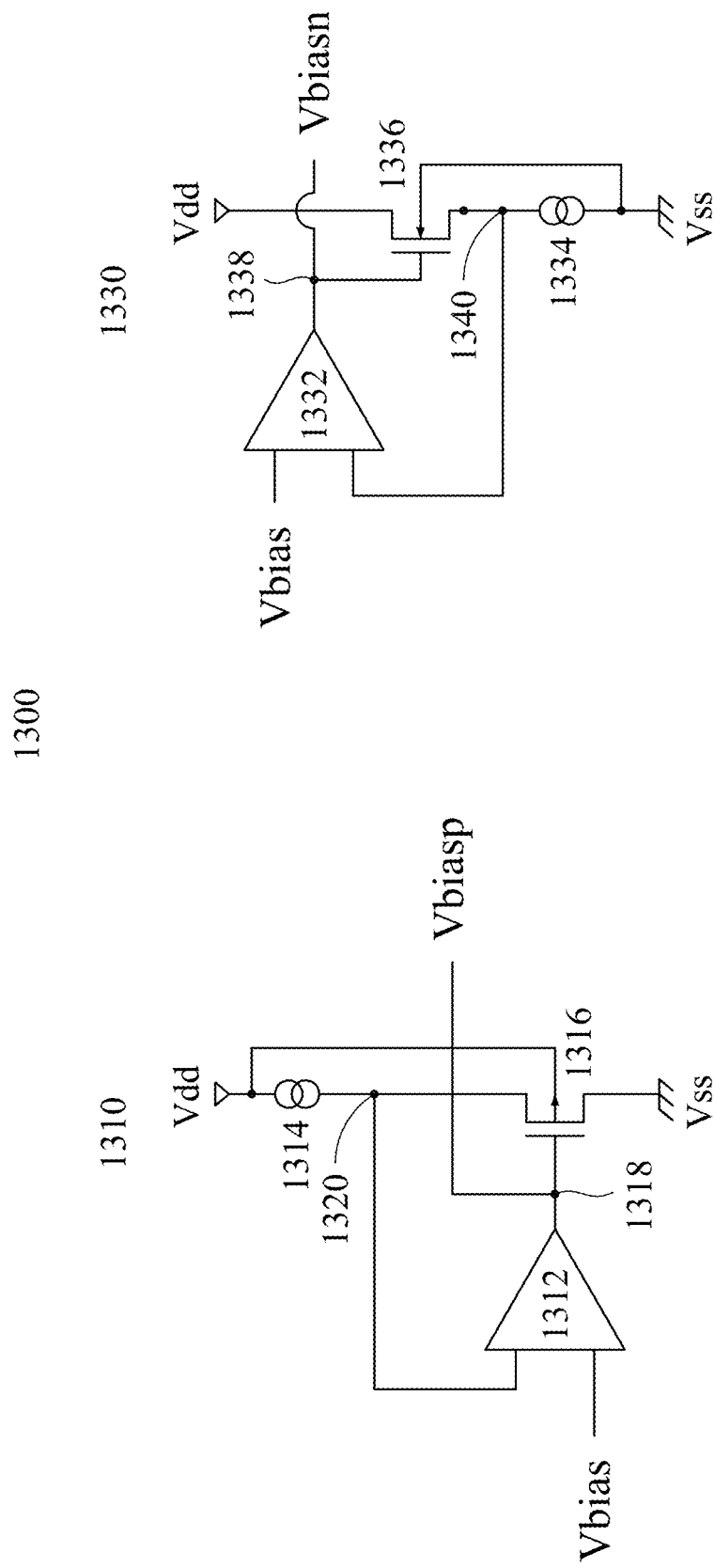

FIG. 13 illustrates a schematic of another example biasing circuit 1300, in accordance with some embodiments. The biasing circuit 1300 can include a first bias voltage generation circuit 1310 and a second bias voltage generation circuit 1330. The first bias voltage generation circuit 1310 and second bias voltage generation circuit 1330 can generate the bias voltages Vbiasp and Vbiasn, respectively, with improved threshold voltage shift that may be potentially caused by channel-length modulation and drain-induced barrier lowering (DIBL).

The first bias voltage generation circuit 1310 can be similar to the first bias voltage generation circuit 810 of FIG. 8. For example, the first bias voltage generation circuit 1310 can include an op-amp 1312 (similar to op-amp 812 of FIG. 8), a p-type transistor 1316 (similar to transistor 816), and a voltage transformer 1314 (similar to voltage transformer 814). However, the back gate terminal of the transistor 1316 is connected to power supply Vdd, instead of the source terminal. Accordingly, the first bias voltage Vbiasp (e.g., Vbias−|Vthp|) can be input to the step-down circuits 902, 1002, and 1004.

The second bias voltage generation circuit 1330 can be similar to the second bias voltage generation circuit 830 of FIG. 8. For example, the second bias voltage generation circuit 1330 can include an op-amp 1332 (similar to op-amp 832 of FIG. 8), an n-type transistor 1336 (similar to transistor 836 of FIG. 8), and a voltage transformer 1334 (similar voltage transformer 834 of FIG. 8). However, the back gate terminal of the transistor 1336 is connected to power supply Vss, instead of the source terminal. Accordingly, the second bias voltage Vbiasn (e.g., Vbias+Vthn) can be input to the step-down circuits 902, 1002, and 1004.

Figure 14:
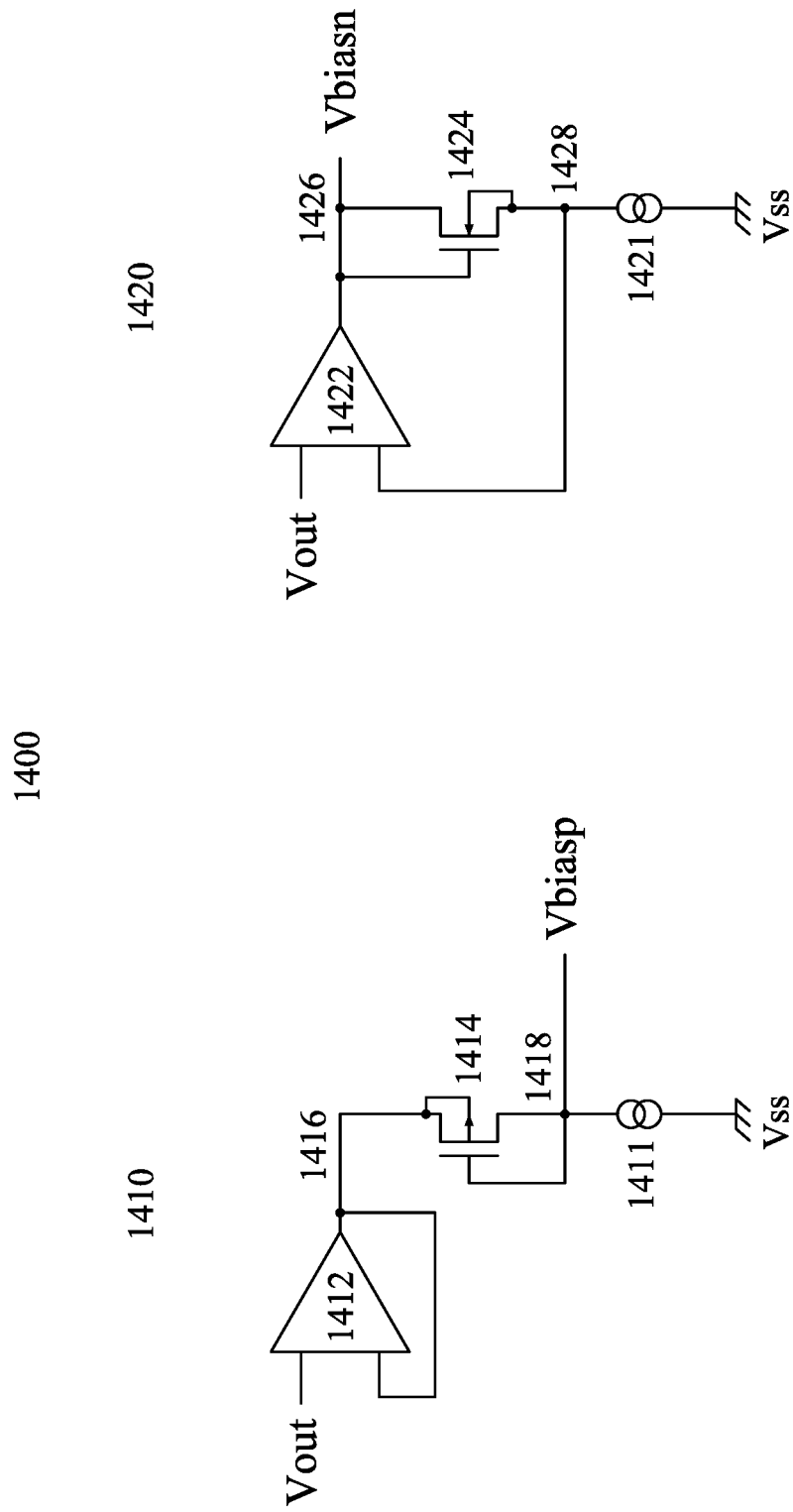

FIG. 14 illustrates a schematic of an example biasing circuit 1400, in accordance with some embodiments. The biasing circuit 1400 can be similar to the biasing circuit 600 of FIG. 6 and include a first bias voltage generation circuit 1410 (similar to first bias voltage generation circuit 610) and a second bias voltage generation circuit 1420 (similar to second bias voltage generation circuit 620). However, unlike the biasing circuit 600, the biasing circuit 1400 can omit a voltage divider (such as voltage divider 602) to generate a biasing voltage Vbias that is provided as an input to op-amp 1412 and op-amp 1422. Instead, the output voltage Vout from the step-down circuit (e.g., step-down circuit 208, 404, 406) can be used to form a feedback loop. Accordingly, the first bias voltage Vbiasp and the second bias voltage Vbiasn can be input to the step-down circuits 208, 404, and 406.

Figure 15:
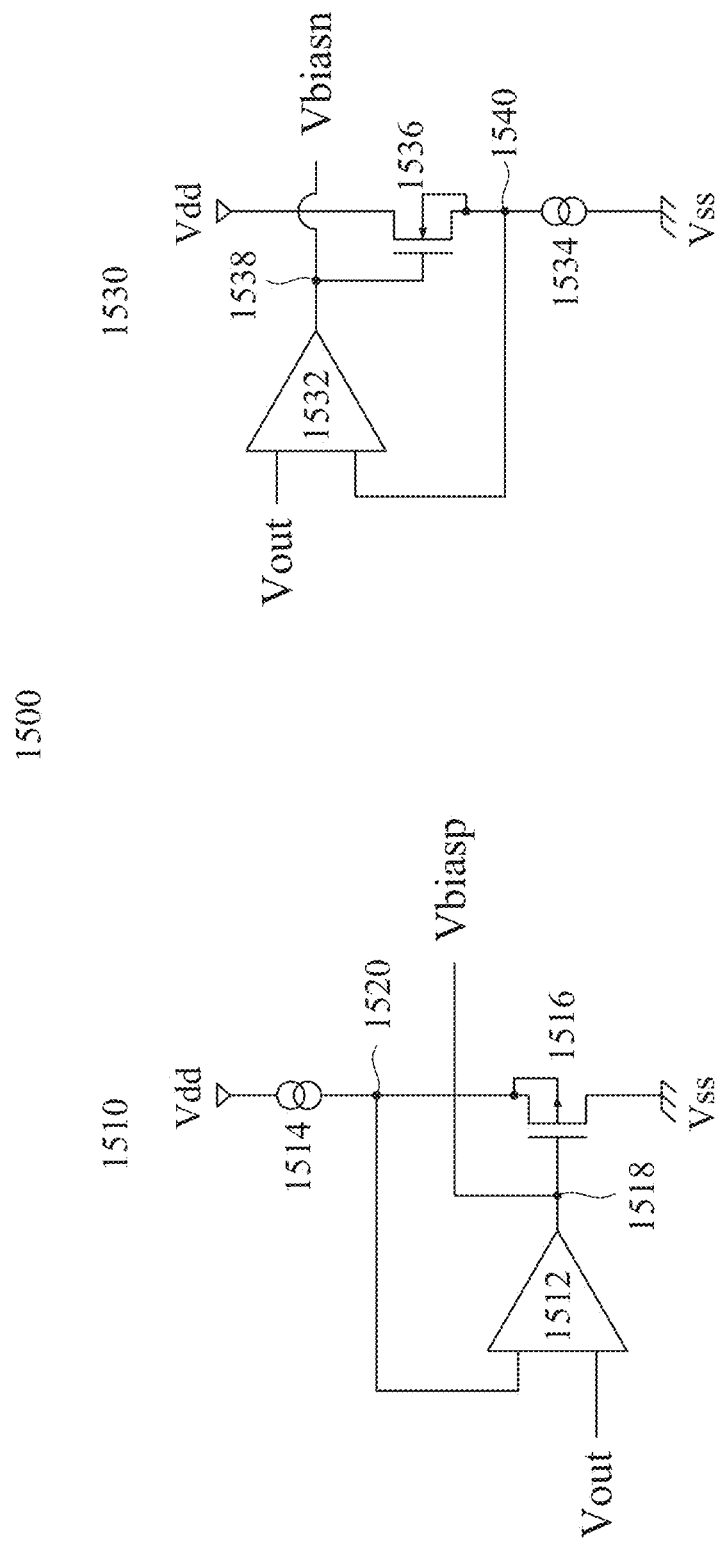

FIG. 15 illustrates a schematic of another example biasing circuit 1500, in accordance with some embodiments. The biasing circuit 1500 can be similar to the biasing circuit 800 and include a first bias voltage generation circuit 1510 (similar to first bias voltage generation circuit 810) and a second bias voltage generation circuit 1530 (similar to second bias voltage generation circuit 830). However, instead of the bias voltage Vbias being input to the op-amps 1512 and 1532, the op-amps 1512 and 1532 receive the output voltage Vout from the step-down circuit (e.g., step-down circuit 208, 404, 406), forming a feedback loop with the step-down circuit. Accordingly, the first bias voltage Vbiasp and the second bias voltage Vbiasn can be input to the step-down circuits 208, 404, and 406.

Figure 16:
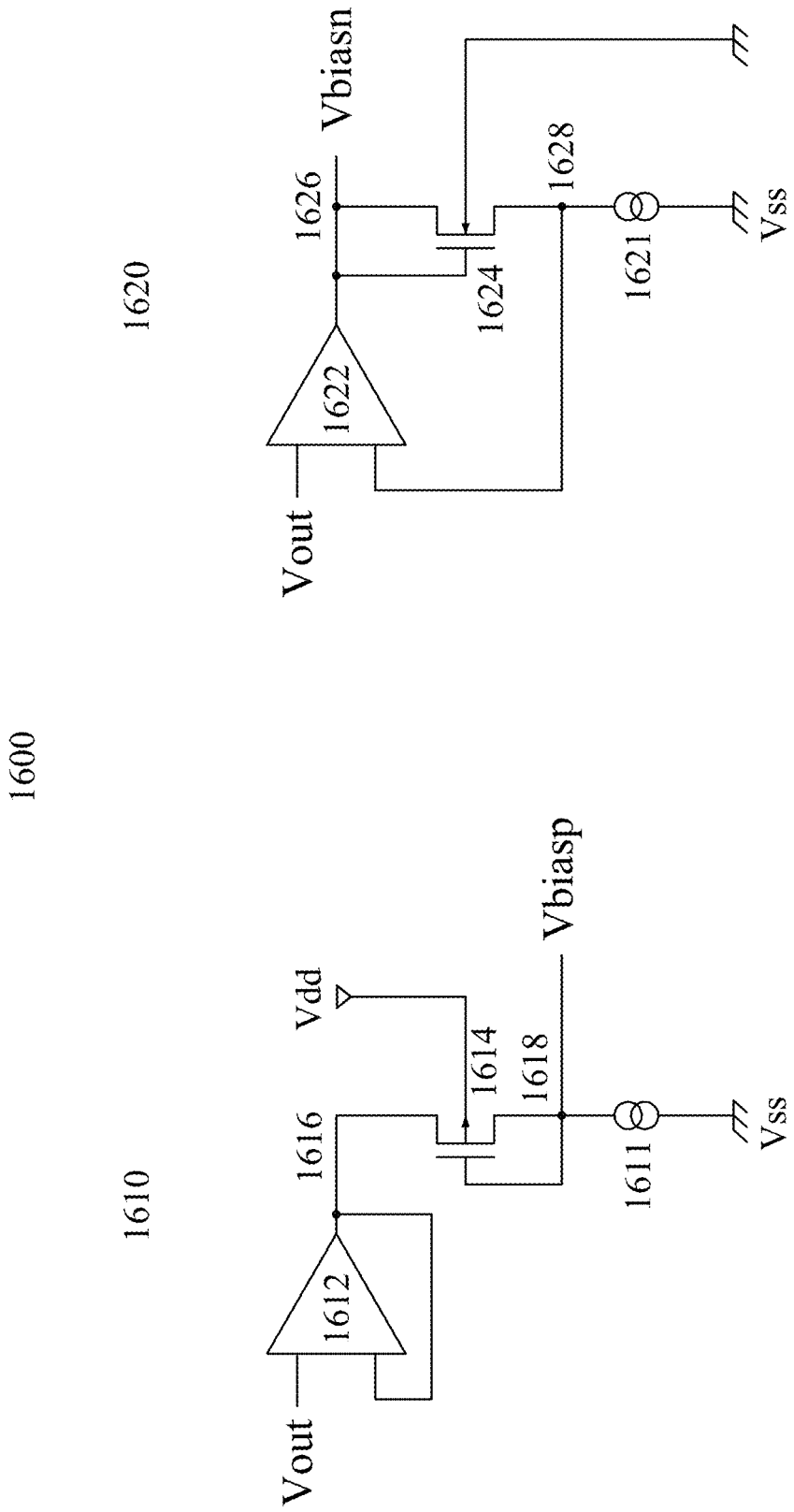

FIG. 16 illustrates a schematic of an example biasing circuit 1600, in accordance with some embodiments. The biasing circuit 1600 can be similar to the biasing circuit 1100 and include a first bias voltage generation circuit 1610 (similar to the first bias voltage generation circuit 1110 of FIG. 11) and a second bias voltage generation circuit 1620 (similar to the second bias voltage generation circuit 1120 of FIG. 11). However, instead of the bias voltage Vbias being input to the op-amps 1612 and 1622, the op-amps 1612 and 1622 receive the output voltage Vout from the step-down circuit (e.g., step-down circuit 902, 1002, and 1004), forming a feedback loop with the step-down circuit. Accordingly, the first bias voltage Vbiasp and the second bias voltage Vbiasn can be input to the step-down circuits 902, 1002, and 1004.

Figure 17:
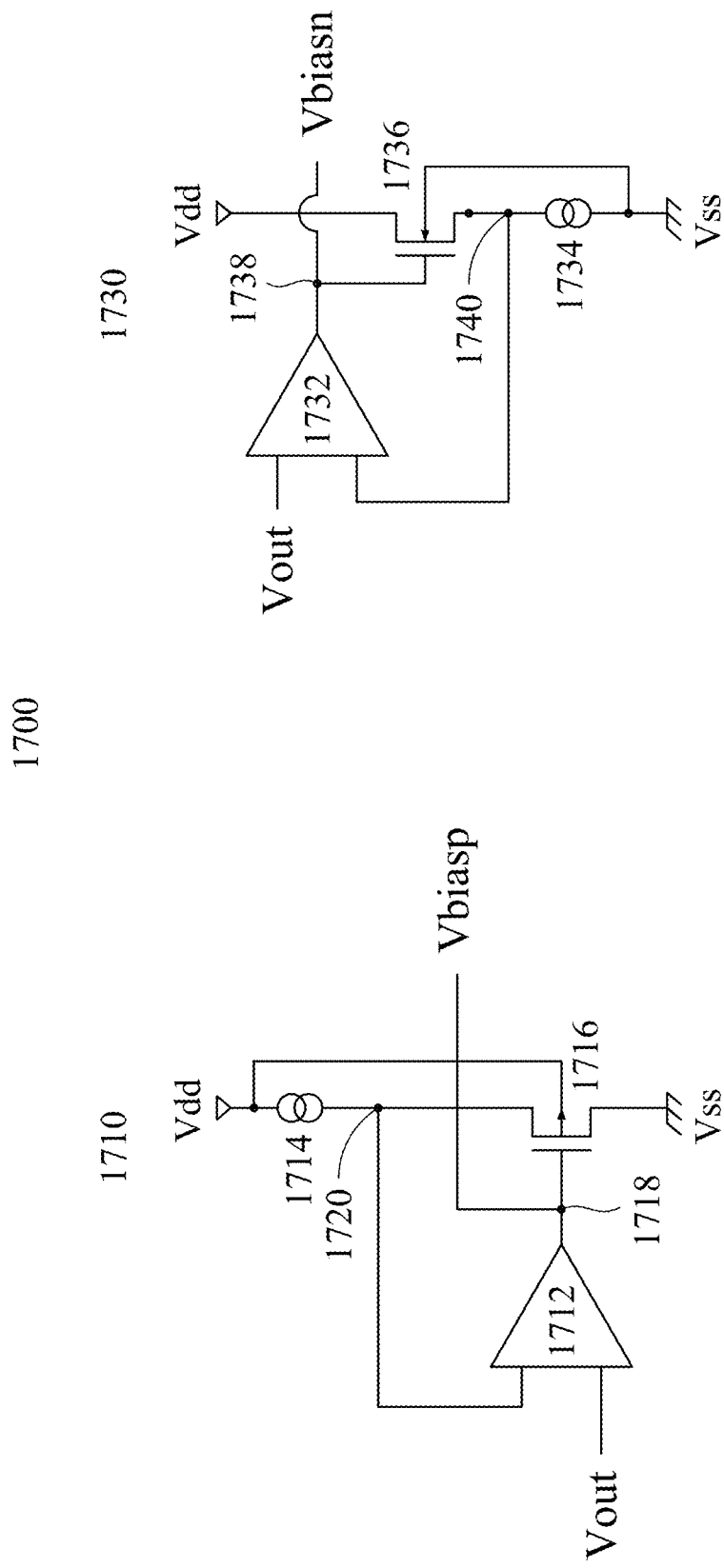

FIG. 17 illustrates a schematic of another example biasing circuit 1700, in accordance with some embodiments. The biasing circuit 1700 can be similar to the biasing circuit 1300 and include a first bias voltage generation circuit 1710 (similar to the first bias voltage generation circuit 1310) and a second bias voltage generation circuit 1730 (similar to the second bias voltage generation circuit 1330). However, instead of the bias voltage Vbias being input to the op-amps 1712 and 1732, the op-amps 1712 and 1732 receive the output voltage Vout from the step-down circuit (e.g., step-down circuit 902, 1002, and 1004), forming a feedback loop with the step-down circuit. Accordingly, the first bias voltage Vbiasp and the second bias voltage Vbiasn can be input to the step-down circuits 902, 1002, and 1004.

Figure 18:
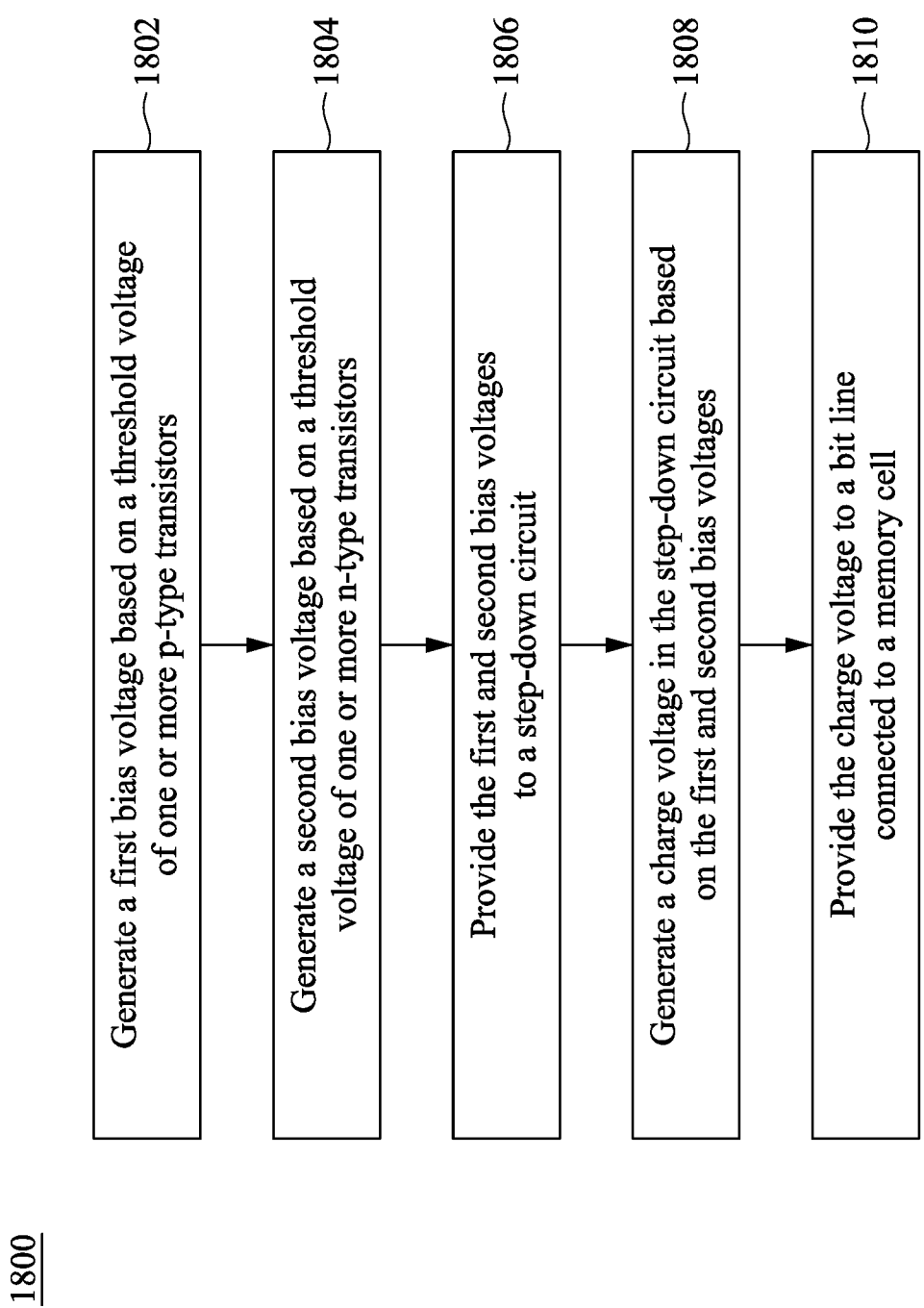
FIG. 18 illustrates a flowchart of an example method of operating a semiconductor device, in accordance with some embodiments.

FIG. 18 illustrates a flowchart of an example method 1800 of operating a semiconductor device, in accordance with some embodiments. The method 1800 may be used to operate a semiconductor device (e.g., semiconductor device 100) providing a stabilized pre-charging voltage with reduced ripple and switching noise to bit lines of a memory device. For example, at least some of the operations described in the method 1800 use layouts and schematics described in FIGS. 1-17. It is noted that the method 1800 is merely an example and is not intended to limit the present disclosure. Accordingly, it is understood that additional operations may be provided before, during, and after the method 1800 of FIG. 18, and that some other operations may only be briefly described herein.

In brief overview, the method 1800 starts with operation 1802 of generating a first bias voltage based on a threshold voltage of one or more p-type transistors. The method 1800 proceeds to operation 1804 of generating a second bias voltage based on a threshold voltage of one or more n-type transistors. The method 1800 proceeds to operation 1806 of providing the first and second bias voltages to a step-down circuit. The method 1800 proceeds to operation 1808 of generating a charge voltage in the step-down circuit based on the first and second bias voltages. The method 1800 proceeds to operation 1810 of providing the charge voltage to a bit line connected to a memory cell.

Referring to operation 1802, the first bias voltage (e.g., first bias voltage Vbiasp) is generated. The first bias voltage may be generated first using a voltage divider (e.g., voltage divider 602) to generate a third bias voltage (e.g., bias voltage Vbias) or using several components in series (e.g., biasing circuit 700). The first bias voltage has a voltage level that equals or substantially equals a difference between the third bias voltage and the absolute value of the threshold voltage of a p-type transistor used to generate the first bias voltage.

Referring to operation 1804, a second bias voltage (e.g., second bias voltage Vbiasn) is generated. The second bias voltage may be generated first using a voltage divider (e.g., voltage divider 602) to generate a third bias voltage (e.g., bias voltage Vbias) or using several components in series (e.g., biasing circuit 700). The second bias voltage has a voltage level that equals or substantially equals a sum of the third bias voltage and the threshold voltage of an n-type transistor used to generate the second bias voltage.

Referring to operation 1806, the first and second bias voltages are provided to the step-down circuit (e.g., step-down circuit 208, 404, 406, 902, 1002, 1004). The step-down circuit may include a 1-phase/stage step-down circuit (e.g., step-down circuit 208, 902) or a 2-phase/stage step-down circuit (e.g., step-down circuits 404 and 406, step-down circuits 1002 and 1004).

Referring to operation 1808, a charge voltage (e.g., output voltage Vout) is generated by the step-down circuit based on the first and second bias voltages.

Referring to operation 1810, the generated charge voltage is provided to a bit line to charge the bit line. The output voltage may be half of the power supply (e.g., power supply Vdd).

In one aspect of the present disclosure, a semiconductor device is disclosed. The semiconductor device includes a memory cell connected to a bit line; a biasing circuit configured to output a first bias voltage and a second bias voltage, the first bias voltage generated based on a threshold voltage of a p-type transistor, and the second bias voltage generated based on a threshold voltage of an n-type transistor; and a step-down circuit connected to the bit line. The step-down circuit is configured to receive the first and second bias voltages; and output an output voltage to charge the bit line based on the first and second bias voltages.

In another aspect of the present disclosure, a method of operating a semiconductor device is disclosed. The method includes generating a first bias voltage based on a threshold voltage of one or more p-type transistors. The method includes generating a second bias voltage based on a threshold voltage of one or more n-type transistors. The method includes generating a charge voltage based on the first and second bias voltages. The method includes providing the charge voltage to a bit line connected to a memory cell.

In yet another aspect of the present disclosure, a semiconductor device is disclosed. The semiconductor device includes a matrix of memory cells arranged in a plurality of columns and a plurality of rows, each memory cell connected to a respective bit line; and a charge circuit connected to the respective bit line. The charge circuit includes a biasing circuit configured to output a first bias voltage and a second bias voltage, the first bias voltage generated based on a threshold voltage of a p-type transistor, and the second bias voltage generated based on a threshold voltage of an n-type transistor; and a step-down circuit connected to the bit line and configured to receive the first and second bias voltages, the step-down circuit configured to output an output voltage to charge the bit line based on the first and second bias voltages.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
   a memory cell connected to a bit line;
   a biasing circuit configured to output a first bias voltage and a second bias voltage, the first bias voltage generated based on a threshold voltage of a p-type transistor, and the second bias voltage generated based on a threshold voltage of an n-type transistor; and
   a step-down circuit, comprising a plurality of transistors and a plurality of capacitors, connected to the bit line, and configured to:
      receive the first and second bias voltages; and
      output an output voltage to charge the bit line based on the first and second bias voltages;
   wherein the biasing circuit includes a plurality of operational amplifiers configured to receive the output voltage as an input.

2. The semiconductor device of claim 1, further comprising:
   a voltage divider configured to generate a third bias voltage,
   wherein the biasing circuit includes:
      a first biasing portion configured to generate the first bias voltage based on the third bias voltage; and
      a second biasing portion configured to generate the second bias voltage based on the third bias voltage.

3. The semiconductor device of claim 2, wherein the first biasing portion includes:
   a p-type transistor including a source terminal, a drain terminal, and a gate terminal, wherein the drain and gate terminals of the p-type transistor are connected to each other and configured to output the first bias voltage; and
   a first operational amplifier (op-amp) including a first input connected to the third bias voltage and a second input connected to an output of the first op-amp, and wherein the output of the first operational amplifier is connected to the source terminal of the p-type transistor.

4. The semiconductor device of claim 3, wherein the second biasing portion includes:
   an n-type transistor including a source terminal, a drain terminal, and a gate terminal, wherein the drain and gate terminals of the n-type transistor are connected to each other and configured to output the second bias voltage; and
   a second op-amp including a first input connected to the third bias voltage and a second input connected to the source terminal of the n-type transistor, and
   wherein the output of the second op-amp is connected to the drain terminal of the n-type transistor.

5. The semiconductor device of claim 2, wherein the first biasing portion includes:
   a p-type transistor including a source terminal, a drain terminal, and a gate terminal, wherein the drain terminal is connected to a ground terminal; and
   a first op-amp including a first input connected to the third bias voltage, a second input connected to the source terminal of the p-type transistor, and an output connected to the gate terminal of the p-type transistor and configured to output the first bias voltage.

6. The semiconductor device of claim 5, wherein the second biasing portion includes:
   an n-type transistor including a source terminal, a drain terminal, and a gate terminal, wherein the drain terminal is connected to a power supply; and
   a second op-amp including a first input connected to the third bias voltage, a second input connected to the source terminal of the n-type transistor, and an output connected to the gate terminal of the n-type transistor and configured to output the second bias voltage.

7. The semiconductor device of claim 1, wherein the biasing circuit includes a first biasing portion including:
   a first resistor connected to a first power supply;
   a first p-type transistor including a source terminal, a drain terminal, and a gate terminal, wherein the source terminal of the first p-type transistor is connected to the first resistor and the drain and gate terminals of the first p-type transistor are connected to each other;
   a second p-type transistor including a source terminal, a drain terminal, and a gate terminal, wherein the source terminal of the second p-type transistor is connected to the drain and gate terminals of the first p-type transistor, and the drain and gate terminals of the second p-type transistor are connected to each other, and wherein the drain terminal of the second p-type transistor is configured to provide the first bias voltage; and
   a second resistor connected to the gate terminal of the second p-type transistor and a ground terminal.

8. The semiconductor device of claim 7, wherein the biasing circuit includes a second biasing portion including:
   a third resistor connected to a first power supply;
   a first p-type transistor including a source terminal, a drain terminal, and a gate terminal, wherein the drain and gate terminals of the first p-type transistor are connected to each other and the first resistor, and wherein the drain terminal of the first p-type transistor is configured to provide the second bias voltage;
   a second p-type transistor including a source terminal, a drain terminal, and a gate terminal, wherein the drain and gate terminals of the second p-type transistor are connected to the source terminal of the first p-type transistor; and a fourth resistor connected to the source terminal of the second p-type transistor and the ground terminal.

9. The semiconductor device of claim 1, wherein each of the p-type and n-type transistors have a non-floating well configuration.

10. A method of operating a semiconductor device, comprising:
generating a first bias voltage based on a threshold voltage of one or more p-type transistors;
generating a second bias voltage based on a threshold voltage of one or more n-type transistors;
generating, through a plurality of transistors and a plurality of capacitors, a charge voltage based on the first and second bias voltages; and
providing the charge voltage to a bit line connected to a memory cell, wherein the charge voltage is received by a plurality of operational amplifiers as an input.

11. The method of claim 10, wherein generating the first bias voltage comprises:
providing a third bias voltage, based on a voltage divider, to a first bias voltage generation circuit;
amplifying a difference between the third bias voltage and a feedback input from the first bias voltage generation circuit; and
generating the first bias voltage based on the amplified difference, the first bias voltage comprising a difference between the third bias voltage and a threshold voltage of a p-type transistor of the first bias voltage generation circuit.

12. The method of claim 11, wherein generating the second bias voltage comprises:
providing the third bias voltage, based on the voltage divider, to a second bias voltage generation circuit;
amplifying a difference between the third bias voltage and a feedback input from the second bias voltage generation circuit; and
generating the second bias voltage based on the amplified difference, the second bias voltage comprising a sum of the third bias voltage and a threshold voltage of an n-type transistor of the second bias voltage generation circuit.

13. The method of claim 10, wherein each of the one or more p-type transistors and the one or more n-type transistors include a floating well configuration.

14. The method of claim 10, wherein generating the first bias voltage comprises connecting, in series, a first resistor, two diode-connected p-type transistors and a second resistor, and wherein providing the first bias voltage includes connecting a first node, disposed between a first diode-connected p-type transistor and the second resistor, to a step-down circuit.

15. The method of claim 14, wherein generating the second bias voltage comprises connecting, in series, a third resistor, two diode-connected n-type transistors and a fourth resistor, and wherein providing the second bias voltage includes connecting a second node, disposed between the third resistor and a first diode-connected n-type transistor of the two diode-connected n-type transistors, to the step-down circuit.

16. A semiconductor device, comprising:
a matrix of memory cells arranged in a plurality of columns and a plurality of rows, each memory cell connected to a respective bit line; and
a charge circuit connected to the respective bit line, wherein the charge circuit includes:
a biasing circuit configured to output a first bias voltage and a second bias voltage, the first bias voltage generated based on a threshold voltage of a p-type transistor, and the second bias voltage generated based on a threshold voltage of an n-type transistor; and a step-down circuit comprising a plurality of transistors and a plurality of capacitors, connected to a bit line, and configured to receive the first and second bias voltages, the step-down circuit configured to output an output voltage to charge the bit line based on the first and second bias voltages;
wherein the biasing circuit includes a plurality of operational amplifiers configured to receive the output voltage.

17. The semiconductor device of claim 16, wherein the charge circuit further comprises a voltage divider configured to generate a third bias voltage,
wherein the biasing circuit is configured to:
provide the first bias voltage, based on the third bias voltage, that is a difference between the third bias voltage and an absolute value of the threshold voltage of a p-type transistor of the biasing circuit, and provide the second bias voltage, based on the third bias voltage, that is a sum of the third bias voltage and the threshold voltage of an n-type transistor of the biasing circuit.

18. The semiconductor device of claim 16, wherein each of the p-type and n-type transistors have a non-floating well configuration.

19. The semiconductor device of claim 17, wherein the biasing circuit includes:
a first biasing portion configured to generate the first bias voltage based on the third bias voltage; and
a second biasing portion configured to generate the second bias voltage based on the third bias voltage.

20. The semiconductor device of claim 16, wherein each of the p-type and n-type transistors have a non-floating well configuration.

* * * * *